United States Patent [19]

Savit

[11] 4,224,474

[45] Sep. 23, 1980

[54] METHOD AND APPARATUS FOR DEMULTIPLEXING MULTIPLEXED SEISMIC DATA

[75] Inventor: Carl H. Savit, Houston, Tex.

[73] Assignee: Western Geophysical Co. of America, Houston, Tex.

[21] Appl. No.: 946,898

[22] Filed: Sep. 28, 1978

[51] Int. Cl.² .......................... H04J 3/02; G01V 1/24
[52] U.S. Cl. ......................................... 370/68; 367/60
[58] Field of Search ................ 340/15.5 DP, 15.5 FC; 364/421; 179/15 AQ; 343/5 DP; 367/60, 67; 179/15 A, 15 AT, 15 BL

[56] References Cited

U.S. PATENT DOCUMENTS

| | | | |
|---|---|---|---|
| 2,958,039 | 10/1960 | Anderson | 340/15.5 DP |
| 3,327,062 | 6/1968 | Klund et al. | 179/15 AC |
| 3,806,886 | 4/1974 | McClellen et al. | 179/15 AQ |
| 3,883,725 | 5/1975 | Fort et al. | 340/15.5 DP |
| 3,914,553 | 10/1975 | Melindo et al. | 179/15 AT |
| 3,930,145 | 12/1975 | Fort et al. | 340/15.5 DP |
| 3,990,036 | 11/1976 | Savit | 367/67 |
| 4,012,719 | 3/1977 | Law et al. | 179/15 A |
| 4,016,531 | 4/1977 | Cook et al. | 340/15.5 DP |
| 4,021,649 | 5/1977 | Fort et al. | 340/15.5 pp |
| 4,064,360 | 12/1977 | Koenig | 179/15 AQ |
| 4,084,151 | 4/1978 | Denner | 340/15.5 DP |
| 4,092,497 | 5/1978 | Lanlan | 179/15 AT |

FOREIGN PATENT DOCUMENTS

| | | | |
|---|---|---|---|
| 2758797 | 7/1978 | Fed. Rep. of Germany | 179/15 A |
| 2225898 | 4/1973 | France | 378/112 |
| 41-6376 | 4/1966 | Japan | 179/15 AT |

OTHER PUBLICATIONS

Inose et al., "Time Division . . . Conversion," Aug. 1972, pp. 762–767, IEEE Trans. on Communic., vol. COM-20, #4.

*Primary Examiner*—Nelson Moskowitz
*Attorney, Agent, or Firm*—William A. Knox

[57] ABSTRACT

A seismic data acquisition system provides seismic signal data samples in multiplexed channel sequential order during a recording cycle. The multiplexed data samples from a recording cycle are demultiplexed by storing the data samples in consecutive order in a memory, having addressable locations, in addressed locations separated by a first desired address increment. The data samples are then extracted from addressed locations that are separated by a second desired address increment. Substantially concurrently, data samples from a subsequent recording cycle are stored in the memory locations vacated by the previously extracted data samples. The data samples from the subsequent recording cycle are demultiplexed by extracting stored data samples from memory locations that are separated by a third desired increment. The above steps are repeated for additional recording cycles, using a different address increment for each extraction step. The extracted demultiplexed data samples may be recorded on an archival storage medium.

19 Claims, 2 Drawing Figures

Fig. 2

METHOD AND APPARATUS FOR DEMULTIPLEXING MULTIPLEXED SEISMIC DATA

BACKGROUND OF THE INVENTION

1. Technical Field of the Invention

This invention is concerned with real-time demultiplexing of channel-sequential data samples as applied to multichannel seismic data acquisition systems.

Definitions

Channel-Sequential Order. In a multichannel system, a multiplexer successively samples the signal present at each channel in sequence, during a scan cycle. The series of data samples acquired from the respective channels during any one scan cycle constitutes a scan of data samples, or more simply, a scan. The resulting data samples in each scan are arranged in the same order in which the channels are sampled. Thus the sequence of data samples will be:

Ch-1, Smp-1; Ch-2, Smp-1; Ch-3, Smp-1; ...; Ch-m, Smp-1;
Ch-1, Smp-2; Ch-2, Smp-2; Ch-3, Smp-2; ...; Ch-m, Smp-2;
..., ...; ..., ...; ..., ...; ..., ...; ..., ...;
..., ...;
Ch-1, Smp-m; Ch-2, Smp-n; Ch-3, Smp-n; ...; Ch-m, Smp-n.

Data words acquired and recorded in channel-sequential order by sample number are said to be arranged in multiplexed format.

Multiplexer. A switching device having a plurality of inputs and a single output. During one sample interval, the multiplexer will scan each input channel in sequence, sample the signal there present, and deliver the sampled signal through an output bus to a signal processor. A sample and hold circuit is assumed to be incorporated into the multiplexer.

Memory Element. For purposes of this disclosure, a memory element is considered to be a location in a memory of sufficient size to contain the four bytes that make up a data word. The memory elements are addressable in consecutive order.

Sample, Data Sample. A digital representation of the sign and magnitude of a sampled analog signal. Expressed as a series of bits, a sample may consist of as many as 32 bits, divided into four bytes of eight bits each. The data samples may be expressed in fixed-point or floating point notation.

Sample-Sequential Order. Data samples are grouped by channels with the samples for each channel arranged in order of the sample number. Thus, the sequence of data samples will be:

Ch-1, Smp-1; Ch-1, Smp-2; Ch-1, Smp-3; ...; Ch-1, Smp-n;
Ch-2, Smp-1; Ch-2, Smp-2; Ch-2, Smp-3; ...; Ch-2, Smp-n;
..., ...; ..., ...; ..., ...; ..., ...; ..., ...;
..., ...;
Ch-m, Smp-1; Ch-m, Smp-2; Ch-m, Smp-3; ...; Ch-m, Smp-n.

Data words recorded in sample-sequential order to channel number are said to be arranged in demultiplexed format.

Sample Interval. The time interval between successive samplings of the same channel. The sample interval may range from ¼ millisecond to 4 milliseconds or more.

Scan Cycle. The time interval during which the signal present in each of a selected number of channels is sampled. The length of a scan cycle is equal to the sample interval.

Recording Cycle. The time interval during which the signals present in the respective input channels are sampled and recorded. Commonly, the recording cycle may be 8 to 16 seconds long. At a sample interval of two milliseconds, 4000 samples will be gathered from each input channel over a recording cycle of eight seconds.

Trace, Trace-Sequential. Data words in sample-sequential order. When converted to analog signals, such data word sequences are displayed as traces on a visual recording medium such as a seismogram. There will be as many traces on a single seismogram as there are data channels.

2. Technical Description of the Prior Art

Present-day seismic data acquisition systems may include more than one hundred signal input channels. The seismic signals present at each input channel are sampled periodically by a multiplexer at intervals such as one or two milliseconds (thousandths of a second) or at some multiple thereof. All of the channels are repeatedly scanned or sampled during a recording cycle of prescribed length. The data samples are processed and are then recorded on an archival storage medium in multiplexed format. For presentation as a visual display of underground earth layers, useful for geological interpretation, the data must be demultiplexed in sample- or trace-sequential order.

Traditionally, seismic data were recorded in the field on magnetic tape in multiplexed format. The tapes were than sent to a data processing center where the data were demultiplexed, further processed, and displayed on visual cross sections. Typically, the multiplexed, field-recorded data were read into a first mass-memory storage device such as a magnetic disc. Demultiplexing was performed by selecting the first sample from each channel from the first storage device and storing the respective samples in a second storage in locations that are separated from each other by a selected number of sequential address slots. Additional samples from the respective channels are then stored in locations that are shifted one address position from the corresponding previous address position. The selected number of sequential address slots is of course, equal to the number, plus one, of channels to be accommodated. It is evident that a very large mass memory is needed since, for a 128-channel system, with a sample interval of 1 millisecond and an 8-second recording cycle, more than one million data words may be recorded per seismic record.

In recent years, the trend in seismic exploration has been to move much of the preliminary data processing, including demultiplexing of multiplexed data, to the site of the field operations. The data processing equipment must be mounted in a recording truck or, at sea, in a boat. Typically, bulk storage devices, such as magnetic discs are extremely bulky and somewhat delicate. Such devices prefer a benign environment, a condition not often found in the field.

As an alternative to a disc, a static memory may be used as bulk storage. But when an entire seismic record has been read into the storage, new data cannot be entered until the static memory has been emptied of the previous data. A considerable amount of lost time results. It would, of course, be possible to provide twin bulk storage units; new data could be written into one unit while old data is being read from the other unit.

This practice doubles the cost of the preprocessing equipment as well as its physical volume.

One method for demultiplexing seismic data is disclosed in U.S. Pat. No. 4,016,531. In this system, a magnetic disc is used. As a teaching of the necessity for demultiplexing multiplexed seismic data, this patent is incorporated herein by reference. Other teachings of the use of a magnetic disc for use in demultiplexing and preprocessing of seismic data will be found in U.S. Pat. Nos. 3,883,725 and 3,930,145. The objections cited above, of course, apply to these known prior-art systems.

In a related, concurrently filed application Ser. No. 946,897 and assigned to the assignee of this invention, a demultiplexing method is disclosed wherein a static memory is employed. The number of locations in the memory is determined from the product of the number of channels and the number of samples to be demultiplexed, plus an additional initialization buffer. The dimensions of the initialization buffer are related to the ratio between the sample loading or storage rate and the sample extraction rate and to the ratio of the number of channels to the number of samples per channel. But the addition of an initialization buffer represents additional expense and bulk. Accordingly it would be desirable to make use of a real-time demultiplexing scheme that requires no more than just enough storage capacity to contain the data from a single recording cycle.

SUMMARY OF THE INVENTION

It is an object of this invention to provide a method and apparatus for demultiplexing previously multiplexed seismic data in real time, that requires a minimal amount of digital storage space.

In accordance with an aspect of this invention, a multichannel seismic data acquisition system includes a multiplexer for sampling the signals present at the respective input channels at desired sample intervals during a recording cycle. The samples, in multiplexed format, are processed and digitized as data words. A digital memory is provided. The memory contains MN data sample storage locations that have consecutive addresses from 0 to MN-1, where M is the number of seismic signal input channels and N is the number of data samples per recording cycle.

In accordance with another aspect of this invention a series of recording cycles are initiated at desired intervals. In accordance with this invention there is no requirement for any time delay between the end of one recording cycle and the beginning of the next, although a short period of one or two sample intervals between the two recording cycles may simplify the required transition circuitry. The series of recording cycles is divided into blocks, each block including predetermined number, n, of recording cycles. The respective recording cycles within a block are assigned corresponding ordinal numbers. Channel-sequential, multiplexed data samples from a specified recording cycle are stored consecutively into memory at addressed locations that are separated by a first preselected address increment. The stored data samples are then extracted in sample sequential order from addressed locations that are separated by a second preselected address increment. Substantially concurrently with the data-extraction operation, multiplexed data samples from the next recording cycle are stored in the locations vacated by the extracted data samples. The above steps are repeated for the remaining recording cycles in the block, using a different address increment for each data-sample extraction operation. Extracted, demultiplexed data samples are recorded in sample-sequential order by channel number on an archival storage such as a magnetic tape.

In accordance with another aspect of this invention, there is a unique address increment associated with the extraction operation of each recording cycle in a block. The address increment $I(i)$, ($0 \leq i$) of the extraction operation for the ith recording cycle is a function of the immediately preceeding address increment of the data loading step of that recording cycle and of the number of channels. In particular, $I(O)=1$ and $$I(i) = MI(i-1) \tag{1}$$

If the quantity on the right hand side of (1) exceeds $(MN-1)$, then $(MN-1)$ is repeatedly subtracted until the remainder is less than $(MN-1)$. In the notation of that branch of mathematics known as the Theory of Numbers, equation (1) can be expressed more compactly as $$\begin{aligned} I(i) &\equiv MI(i\text{-}1) \bmod (MN\text{-}1) \\ &\equiv M^i \bmod (MN\text{-}1). \end{aligned} \tag{2}$$

In accordance with still another aspect of this invention, the first data sample of any recording cycle is always assigned to location 0 and the last sample to location MN-1.

In accordance with other aspects of this invention, the data sample extraction rate is equal to or faster than the data sample storage rate.

In accordance with another aspect of this invention, the sequence of address increments repeats from block to block provided the number of channels and the number of samples acquired remains the same for each block.

In accordance with yet a further aspect of this invention, the predetermined number of recording cycles, n, within a block is equal to $\log_{(2)} MN$ where 2 is the desired number base, M and N being expressable as powers of 2.

BRIEF DESCRIPTION OF THE DRAWINGS

Other objects, features and advantages of this invention will be better understood by reference to the appended description and the drawings wherein:

FIG. 2 is a detailed showing of the method for demultiplexing multiplexed seismic data.

DETAILED DESCRIPTION OF THE PREFERRED EMBODIMENT

Figure 1:
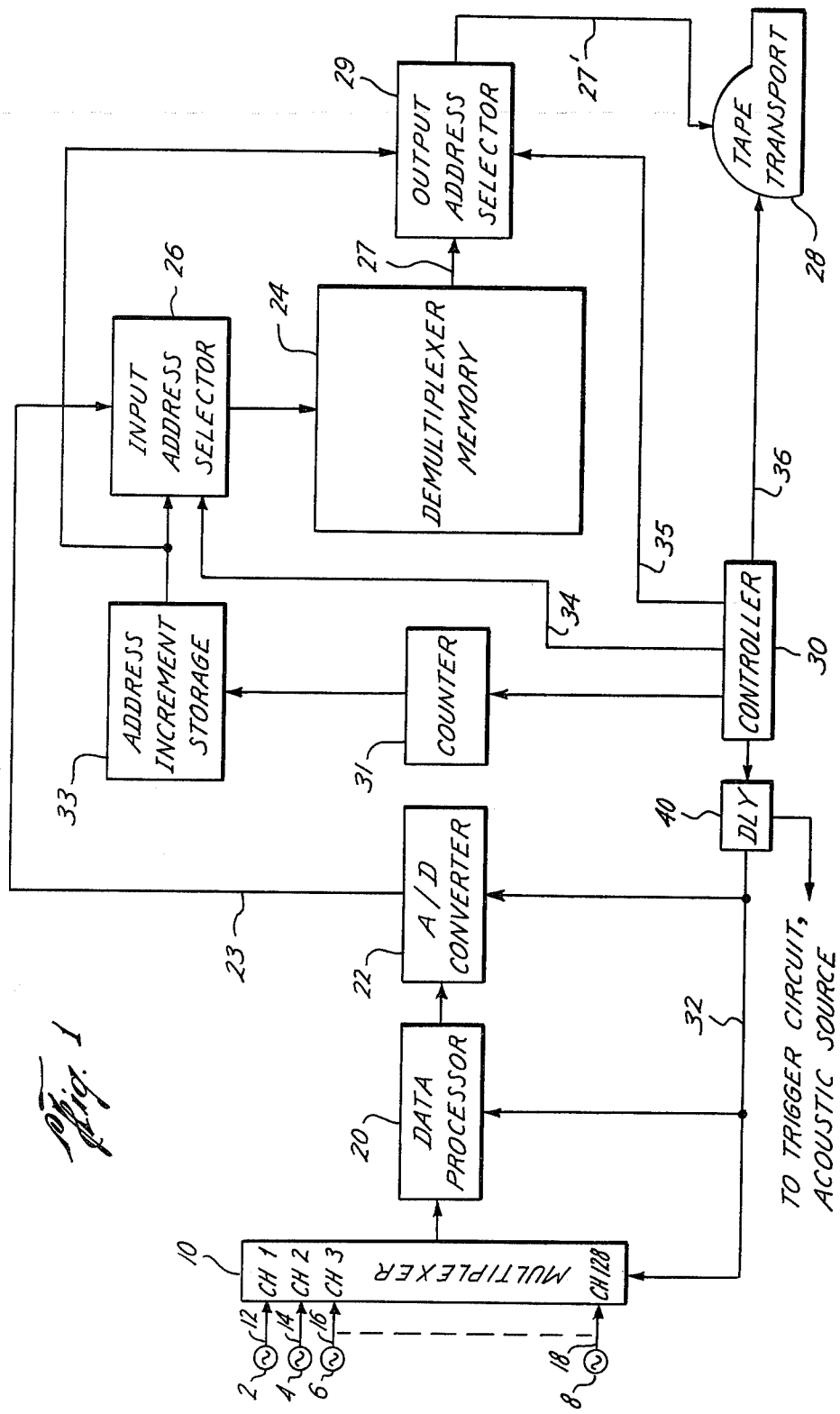
FIG. 1 is a block diagram showing the essential features of a multichannel seismic recording system with which this invention may be used.

Referring to FIG. 1 there is shown a multichannel seismic system employing the method of my invention.

A number of seismic sensors or sensor groups 2, 4, 6, 8, sensitive to seismic signals, are connected to a multiplexer 10 by suitable signal transmission lines 12, 14, 16, 18, to input channels Ch-1, Ch-2, Ch-3, . . . , Ch-128. For simplicity only the first three channels and the last channel, Ch-128, are shown. It is to be understood that more or fewer than 128 input channels may be employed.

A recording cycle is initiated, by triggering a source of seismic acoustic waves (not shown). Multiplexer 10 then repeatedly scans input channels Ch-1 to Ch-128 at, for example, two millisecond intervals to sample the amplitude and polarity of the signal there present. Each scan of multiplexer 10 results in a sequence of analog data signal samples in multiplexed, channel-sequential format. The multiplexed signal samples are filtered and gain-conditioned in data processor 20. The processed signals are then delivered to analog-to-digital converter 22 where each analog sample is digitized as a multibit digital data sample representative of the amplitude and polarity of each processed analog data sample. During a recording cycle, the data samples are loaded over line 23 to be stored or written into demultiplexer memory 24 under control of the input address selector module 26. At the end of the recording cycle, the data samples previously stored in demultiplexer memory 24 are extracted or read out in demultiplexed format over lines 27, 27' to an archival storage device 28 such as a magnetic tape. Extraction is accomplished under control of output address selector module 29. Input address selector 26 and output address selector module 29 are programmed by counter 31 and address increment storage 33. As soon as the first recording cycle is completed a second recording cycle is begun, and new data samples are loaded into demultiplexer memory 24 while old data are still being extracted, although there may be a short delay of one or two sample intervals. Alternatively a buffer memory of one or a few samples may be provided to allow time for setting up the necessary mode change. The mechanism by which multiplexed, channel sequential data samples are demultiplexed to sample sequential format will be discussed in following paragraphs. For simplicity, lines 23, 27, 27' are shown as single lines. In actual practice, each line is a multi-line bus whose width is sufficient to accommodate the number of bits included in each data sample.

It is to be understood that the operational sequence of triggering a seismic source, initiating a recording cycle, processing and digitizing the resulting data, demultiplexing the channel-sequential data samples and recording the data samples on tape, is governed by a controller 30 of any well known type that is customarily supplied with conventional seismic recording systems. Control and timing functions are exercised over control bus 32 to the multiplexer 10, data processor 20 and A/D converter 22; control bus 34 to input address selector module 26; control bus 35 to output address selector 29 and control bus 36 to tape transport 28.

Before considering the demultiplex memory logic 24, let us pause to discuss tape transport 28. A preferred tape transport for use with this invention is a Model 6250, made by Telex Corporation of Tulsa, Oklahoma, employing standard one-half inch magnetic tape. This transport operates at a tape speed of 125 inches per second with a packing density of 6250 bytes per inch. Accordingly, the preferred tape transport will record data words at the rate of 781,250 bytes per second. At a sample interval of 2 ms (milliseconds) per channel with 128 input channels to be sampled per interval and four bytes per sample, the seismic system gathers data at the rate of 256,000 bytes per second. Thus the preferred tape recorder will read digital data words about three times faster than real time, relative to the seismic system multiplexer 10.

Figure 2:
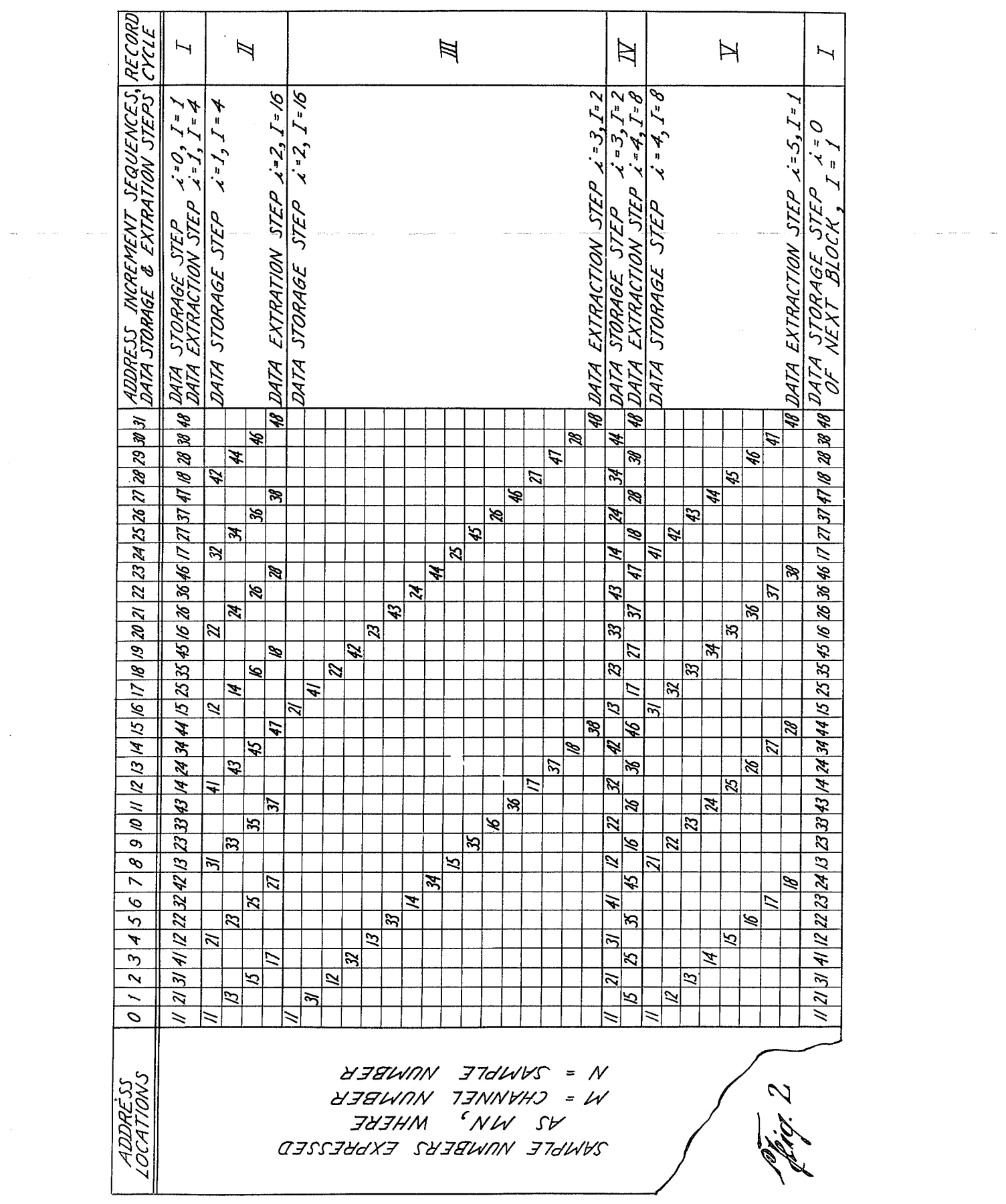

Referring now to FIG. 2, there is shown the structure of demultiplex memory 24. A preferred bulk storage device, useful for use with this invention, is a model 1223 MEGASTORE memory, made by the Ampex corporation, El Segundo, California.

The principle of my invention is best illustrated in FIG. 2. In a real-word seismic system for example, 128 input channels might be used with a recording cycle of about 8 seconds. Accordingly, by way of example but not by way of restriction, at a sample rate of 2 ms, 4096 data samples might be gathered, for a total of 524,288 data samples. However, in order to simplify an exemplary embodiment, it will be assumed that there are only four channels (M=4) and eight samples (N=8) per channel. Since there are four channels having eight samples each, 32 addressable locations or memory elements are needed, with addresses 0 to 31=(MN−1). The addresses are numbered across the top line of FIG. 2. Beneath the address line, are five patterns of figures identified from I-V. Each pattern corresponds to a separate recording cycle comprising the steps of data loading and data extraction. These recording cycles consitute a block of recording cycles.

Groups of double-digit numbers appear at various locations in FIG. 2. The double-digit numbers identify the channel number and the sample number. Thus 11 refers to channel 1, sample 1; 21 refers to channel 2 sample 1; 31 refers to channel 3, sample 1; and 48 refers to channel 4, sample 8.

Referring, for a moment to FIG. 1, it will be seen that the first scan of multiplexer 10 will provide first samples for channel 1, 2, 3 etc., in channel-sequential order. In FIG. 2, the first samples for the four channels are directed to addressed locations 0–3. The second set of samples are sent to locations 4–7 etc., and the eighth samples for the four channels are deposited in locations 28–31, to complete recording cycle I. Thus, the channel sequential data has been stored in addressed locations separated by a first desired address increment of 1, starting at location 0.

Starting at location 0, the stored data samples are now demultiplexed to sample-sequential order for channel number 1 by extracting data samples from locations 0, 4, 8, 12, . . . , 28 to provide the sequence of data samples 11, 12, 13, 14, . . . 18 in sample sequential order for channel 1. Demultiplexed data samples for channel 2 are extracted from locations, 1, 5, 9, . . . , 29 in a similar manner. Thus, starting at location 0, the sample-sequential data samples are extracted from addressed locations separated by a second desired address increment of 4.

As soon as data-sample 11 of recording cycle that is identified as i=0 has been extracted, a new data-sample 11 from recording cycle i=1 is stored in the vacated location. Thus, there must be provided a short delay between recording cycles to allow the first location to become emptied. As little a delay as one sample interval, such as one or two milliseconds suffices. Accordingly, data storing can take place substantially concurrently with data extraction. When data sample 12 has been extracted from location 4, data sample 21 of recording cycle i=1 is stored in its place. Data sample 18 of recording cycle i=0 is replaced by data sample 42 of recording cycle i=1. The next addressed location is 28+4=32. But since there are only 31 addressed locations, (MN−1)=31 must be subtracted from the above sum. Accordingly, data sample 13 is stored in location 32−31=1. The remaining samples of recording cycle i=1 are stored similarly by adding the address increment of 4 to each previous location, subtracting (MN−1) if an addressed location exceeds 31.

Examination of the data sample storage location pattern for recording cycle i=1 reveals that sample-sequential data samples are now stored in addressed locations separated by a third address increment of 16. That is, data sample 11 is in location 0, sample 12 is in location 16, data sample 13 is in location 1=(16+16−31) and so on.

Data samples for recording cycles i=2, 3, and 4 are stored and extracted similarly, using address increments, 2, 8, and 1 respectively for each subsequent data extraction step. After recording cycle i=4 the pattern of address increments repeats itself for the next block of recording cycles.

The number, n, of recording cycles in a block is equal to $$n = \log_{(2)}(MN).$$

Accordingly,
$$\log_2(MN) = \log_2(4 \times 8) = 5,$$

and there are indeed five recording cycles shown in FIG. 2 before the address increment pattern, repeats itself. For the 128-channel real-world system first mentioned above, there would be 19 recording cycles within a block since $524,288 = 2^{19}$.

A study of the pattern of address increments shown in FIG. 2 will show that the address increment, I(i) for the extraction step following any specified immediately preceeding recording cycle within the block indeed conforms to equation (2).

$$I(i) \equiv M^i \bmod (MN-1).$$

Thus, for recording cycle i=2 in FIG. 2, the address increment for the corresponding extraction step is $$\begin{aligned} I(3) &\equiv 4^3 \bmod 31 \\ &\equiv 64 \bmod 31 \\ &\equiv 64 - 2 \times 31 = 2 \end{aligned}$$

The same answer can be deduced by simple inspection of FIG. 2.

Referring again to FIG. 1 let us study in more detail the structure and operation of the demultiplexing system. Demultiplexer memory 24 has sufficient capacity to contain the number of data samples expected, although more capacity could be provided for greater flexibility in the number of samples of channels to be accomodated, if desired. Input address selector 26 directs the respective data samples to the appropriate addressed locations. The first address is always 0 and the last address is always (MN−1). The addresses for each successive data sample is determined by adding an address increment, supplied by address increment storage register, to the previous data sample address. If the so-computed address exceeds (MN−1), (MN−1) is subtracted from the address of input address selector 26 in a manner well known to the art.

If MN is a power of 2 the address selector may be especially simple. In that case the address selector may be a simple accumulator whose maximum capacity is precisely (MN−1), i.e. it has precisely $\log_{(2)}$ (MN) bits. The accumulator is wired so that an overflow carry is fed into the low order bit of the accumulator. By this device the increment I may be added to the accumulator at successive steps of addressing and (MN−1) will automatically be subtracted as required.

Output address selector 29 operates in a fashion similar to input address selector 26. For a given recording cycle, address selector 26 points to an addressed location that is at least one location less than the addressed location in address selector 29. That is, input address selector 26 is always at least one addressed location behind output address selector 29 in order to allow a location to be vacated before new data is stored therein. Furthermore, the input address increment for a subsequent recording cycle is equal to the output address increment for the previous recording cycle.

Counter 31 and address increment storage register 33 are shown as two modules but they could well be included in one unit. As was described earlier, for every numbered recording cycle within a block, there is a corresponding unique address increment. Although it would be possible to compute anew the address increment for each recording cycle, it is simpler for certain values of M and N to precompute the address increments and to store them in a memory such as a ROM. The counter 31 associates a particular address increment with the ordinal number of a particular recording cycle. Use of a ROM for a storage register is practical because even for a billion-location system, if M and N are powers of 2, there would be but 30 different address increments.

In general it may be preferred to select M and N as powers of 2 or to select other values that will minimize the number of different address increments and thereby obviate the need to calculate each increment although the calculation is not onerous and need only be done once in each recording cycle. It is noted that if M=N the number of address increments is precisely 2. In other cases the selection of values of M and N to minimize the number of different address increments should proceed in accordance with the theory of congruences as described in texts on the theory of Numbers such as for example Theory of Numbers, Part I by G. B. Mathews, G. E. Steckert & Co., New York, 1927, particularly page 17 et seq.

In operation, the system functions as follows: At the beginning of a large-scale seismic exploration operation, counter 31 is initialized to a beginning count and address increment storage is loaded with a set of address increment values commensurate with the system hardware capabilities. Controller 30 initiates a first recording cycle by transmitting a trigger pulse to an acoustic source (not shown) and commanding multiplexer to begin to repeatedly scan the signal input channels during said recording cycle. At the same time, counter 31 is incremented by one unit. Counter 31 then causes address increment storage register 33 to send the appropriate address increment to input address selector 26 and output address selector 29. Each analog data sample acquired by multiplexer 30 is processed, digitized and sent to address input selector 26. Under control of controller 30, the data sample is strobed into the starting location in memory 24. Input address selector 26 then increments itself by adding the required address increment and awaits the arrival of the next data sample from the next input channel. During any given recording cycle, of course, the address increment never changes. The above steps continue until the end of the first recording cycle.

During the very first recording cycle of a new seismic exploration operation of course, demultiplex memory 24 initially contains irrelevant data. Output address selector 29, which always functions one sample interval ahead of the input side of the system, transfers whatever it sees in memory, to magnetic tape 28. Accordingly, since no useful data was resident in memory 24 before the first recording cycle, the first output data to tape constitutes a dummy recording or is omitted under direction of controller 30. During subsequent recording cycles, output address selector 29 transfers valid demultiplexed data samples from memory 24 to magnetic tape 28.

Controller 30 continues to initiate recording cycles as above described, incrementing counter 31 each time, which in turn, causes the appropriate address increment to be transferred to address selectors 26 and 29. When the recording cycle count is exhausted at the end of a block, counter 31 rolls over to start a new count. Alternatively if address increments are not to be stored but are to be calculated, counter 31 and address increment storage 33 are replaced by a simple arithmetic unit which may be a microcomputer or the like and which carries out the steps of multiplying the previous increment by M and subtracting (MN−1) when required.

Although not necessarily a separate module, a fixed delay line 40 may be provided to allow the output address selector to extract data samples from one or more initial locations in memory 24 before the memory starts receiving new data. A delay of one or two sample intervals is sufficient. The delay is equal to only a few milliseconds, a delay that is insignificant compared to the duration of a recording cycle which may be 8 seconds or more, so that data storing takes place substantially concurrently with data extraction.

It should be understood that tape transport 28 may be capable of receiving demultiplexed data samples faster than multiplexer 10 can supply multiplexed data samples. In such a case, input address selector 28 and output address selector 29 must necessarily operate asynchronously.

Many variations that fall within the scope and spirit of the above described system will occur to those skilled in the art. The system as described is limited only by the appended claims.

I claim as my invention:

1. An improved method of seismic exploration wherein seismic signals are received in a plurality of data channels, said signals in said data channels being repeatedly sequentially sampled during a recording cycle to provide an output of multiplexed data samples in channel-sequential order by sample number, comprising the steps of:
   sequentially storing said multiplexed data samples from a first recording cycle in consecutive order into addressable locations of a memory at addressed locations that are separated by a first preselected address increment;
   extracting in demultiplexed sample-sequential order said stored data samples from addressed locations separated by a second preselected address increment; and
   substantially concurrently storing multiplexed data samples from a second recording cycle in consecutive order into the addressed locations as those locations are vacated by the previously extracted data samples.

2. The improved method as defined by claim 1 further comprising the steps of:
   extracting in sample-sequential demultiplexed order, the data samples stored during said second recording cycle from addressed locations in said memory that are separated by a third preselected address increment; and
   substantially concurrently storing multiplexed data samples from a third recording cycle, in consecutive order, into the addressed locations as those locations are vacated by the extracted samples of said second recording cycle.

3. The improved method as defined in claim 2, comprising the further steps of:
   during a plurality of recording cycles, repeating the steps of extracting demultiplexed data samples stored during a previous recording cycle and substantially concurrently storing multiplexed data samples from a subsequent recording cycle into the locations vacated by said extracting step; and
   using a different preselected address increment in conjunction with the data-sample extracting step of each subsequent recording cycle.

4. The improved method as defined by claim 3 wherein:
   the data samples extracted during each recording cycle are recorded in demultiplexed format on an archival storage medium in sample-sequential order by channels.

5. The improved method as defined by claim 3 wherein:
   said plurality of recording cycles is subdivided into blocks, each containing a predetermined number of recording cycles, each recording cycle within said block being assigned an ordinal number, the preselected address increment for each recording cycle is a unique function of a selected ordinal number, the respective address increments having a cyclic pattern that is repeatable for each new block of recording cycles so long as the number of channels and the number of data samples remain the same for each new recording-cycle block.

6. The improved method as defined in claim 5 wherein the predetermined number of recording cycles, n, within a block is equal to $n = \log_2(MN)$, M being the number of input channels, and N the number of samples gathered during a recording cycle, M and N being powers of 2.

7. The improved method as defined in claim 6 wherein the preselected address increment I is equal to $I(i) \equiv M^i \bmod(MN-1)$ where i is the ordinal number of a desired recording cycle.

8. In a system for demultiplexing multiplexed seismic data samples, said system including a plurality of seismic signal input channels, means for establishing a plurality of recording cycles, means for repeatedly sampling in consecutive order said seismic signal input channels during each recording cycle at a desired sample intervals to provide digital data samples multiplexed in channel-sequential order by sample number, the improvement comprising:
   a digital memory having a plurality of addressable locations;
   means for storing multiplexed data samples from a recording cycle in consecutive order in said memory at addressed locations that are separated by a desired address increment;
   means for extracting, in demultiplexed format, said stored data samples from addressed locations in said memory that are separated by a different address increment;
   means for substantially concurrently storing multiplexed data samples from another recording cycle into the addressed locations that are vacated by said extracted signals.

9. The improvement as defined by claim 8, further comprising:
means for subdividing said plurality of recording cycles into blocks each including a predetermined number of recording cycles;
means for repeating the multiplexed data-storage and demultiplexed data-extraction of previously stored data samples for each recording cycle of said recording cycle block, using a different address increment in conjunction with each extraction of data samples.

10. The improvement as defined by claim 9, further comprising:
means for counting the ordinal number of successive recording cycles within a recording cycle block; and
means for determining the address increment to be applied during a desired recording cycle as a function of the ordinal number assigned to said desired recording cycle.

11. The improvement as defined by claim 10 wherein there is a delay of one sample interval between the time that the first demultiplexed data sample from a previous recording cycle is extracted and the time that the first multiplexed data sample from a subsequent recording cycle is stored.

12. The improvement as defined by claim 11 wherein the data-sample extraction rate is the same as the data storage rate.

13. The improvement as defined by claim 11 wherein the data-sample extraction rate is faster than the data storage rate.

14. The improvement as defined by claims 12 or 13 wherein means are provided for recording the demultiplexed extracted data samples from each recording cycle on an archival storage medium in sample-sequential-by-channel-number order.

15. A real time method for reordering the ordered data values in each set of a progression of data sets in a data stream within a minimum number of memory addresses in a memory comprising:
writing the ordered data values of a first data set of said progression into said memory in a sequence of memory elements defined by a first sequence of addresses;
reading the data values of said first data set from said memory elements in a sequence defined by a second sequence of addresses;
and writing the ordered values of a second data set of said progression into said memory in the sequence of memory elements defined by said second sequence of address so that the writing of said second data set begins before the reading of said second data set is completed.

16. The method of claim 15 in which each successive data set of said progression is written into memory in a sequence defined by the sequence of addresses used to define the sequence of memory elements from which the next preceeding data set of said progression were read;
and each writing sequence after the first begins before the immediately preceeding reading sequence is completed.

17. The method of claim 15 in which the second data set is read from memory in accordance with a third sequence of addresses different from said second sequence of addresses.

18. The method of claim 16 wherein the sequence of addresses, in accordance with which a specific data set is read from memory, differs from the sequence of addresses in accordance with which said specific data set was written into memory.

19. A method for recording in real time, the ordered data values in each set of a plurality of such sets comprising the steps of:
writing the ordered values of a first data set of said plurality into a memory in a sequence of memory elements according to a first sequence of addresses;
reading the data values of said first data set from a sequence of memory elements according to a second sequence of addresses;
before the reading of said first set of data values is completed, writing the ordered values of a second set of data values of the plurality into the sequence of memory elements according to said second sequence of addresses;
for each subsequent set of data values of said plurality, repeating the steps of reading the previously-written data values of a preceeding data set from a sequence of memory elements and before completion of said reading step, writing the data values of a next set of data values of said plurality into said sequence of memory elements, the sequence of addresses defining the location of the memory elements being different for each repetition of said reading step.

* * * * *